United States Patent [19]

Hertz, Jr.

[11] Patent Number: 4,524,981
[45] Date of Patent: Jun. 25, 1985

[54] ANNULAR SEAL WITH V-CUT

[75] Inventor: Daniel L. Hertz, Jr., Red Bank, N.J.

[73] Assignee: Smith International, Inc., Newport Beach, Calif.

[21] Appl. No.: 554,188

[22] Filed: Nov. 22, 1983

[51] Int. Cl.³ ............................................. F16J 15/40
[52] U.S. Cl. ...................................................... 277/210
[58] Field of Search ................ 277/208, 209, 210, 214, 277/215

[56] References Cited

U.S. PATENT DOCUMENTS

| | | | |
|---|---|---|---|
| 1,926,197 | 9/1933 | Durr | 277/208 |
| 2,935,349 | 5/1960 | Burch | 277/210 |
| 3,120,960 | 2/1964 | Pippert et al. | 277/230 |
| 3,901,517 | 8/1975 | Heathcott | 277/205 |
| 3,915,463 | 10/1975 | Pippert | 277/205 |
| 4,438,935 | 3/1984 | Lees | 277/205 |

Primary Examiner—Robert I. Smith
Attorney, Agent, or Firm—David A. Rose; William E. Shull; David S. Wise

[57] ABSTRACT

There is described herein an annular elastomer seal arranged for primary compression-type sealing capability and secondary lip-type sealing capability. The annular seal includes a pair of grooves in a radial seal face thereof, the grooves diverging with depth to form what appears as a V-shaped cut when the seal is viewed in radial cross section. When compressive stress diminishes as a result of elastomer relaxation phenomena, seepage of pressurized fluid into the grooves creates a lip seal.

16 Claims, 3 Drawing Figures

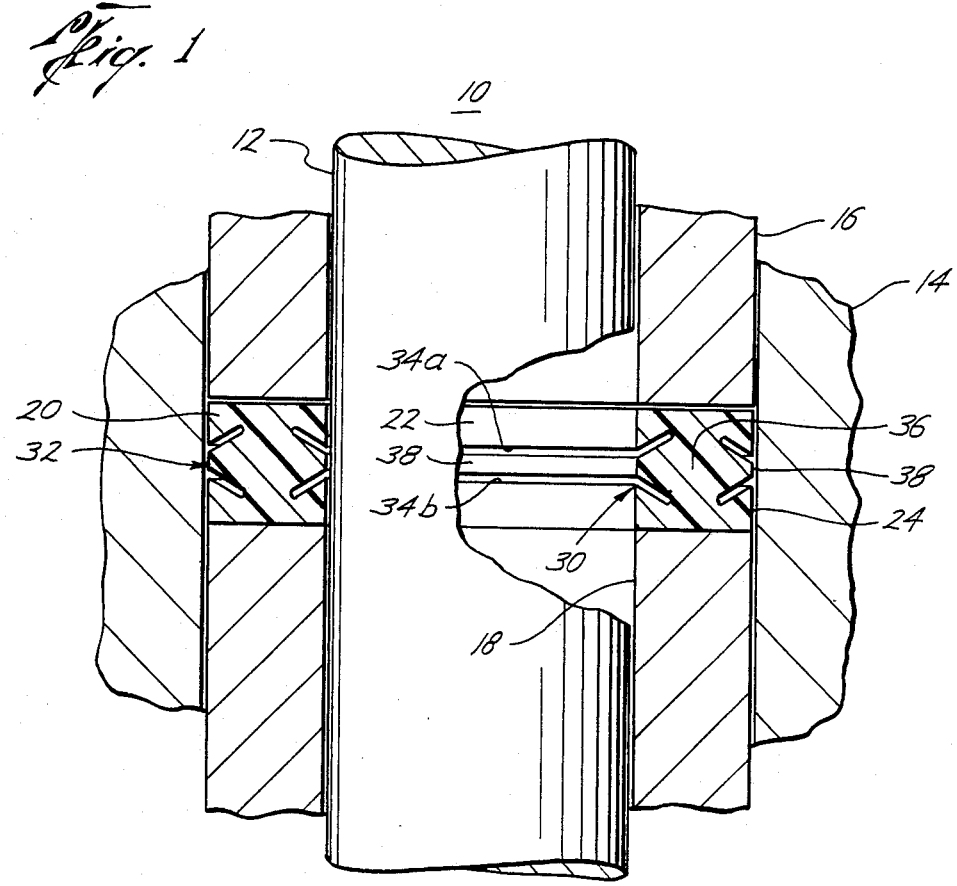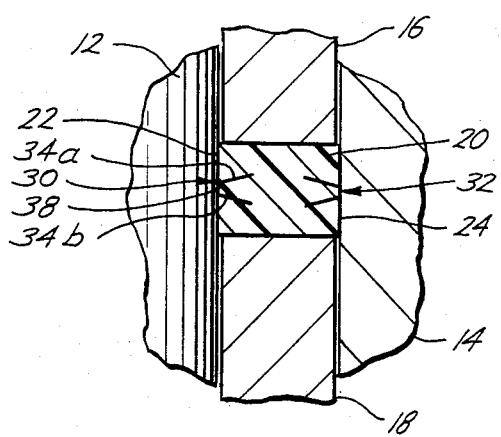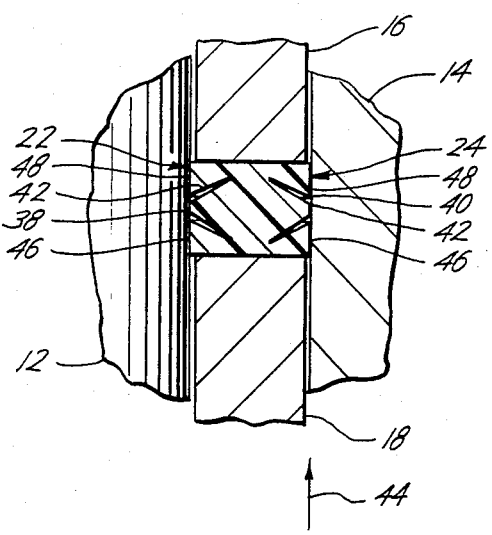

ANNULAR SEAL WITH V-CUT

BACKGROUND OF THE INVENTION

The present invention is directed to the art of elastomer fluid seals and, more particularly, to compression-type elastomer seals. Still more particularly, the present invention is directed to elastomer seals arranged in an annular configuration to form a compression-type annular seal.

Elastomer seals arranged in an annular configuration are used in a variety of applications, for example, in oilfield equipment such as casing hangers, tubing hangers, and wellhead valves. Typically, the annular seals are exposed to axially directed compressive stress to create a strain-induced fluid seal about an inner diameter seal face or an outer diameter seal face or both. Elastomers, however, are subject to certain relaxation phenomena which tend, over time, to diminish the sealing capacity of a compression-type elastomer seal.

Elastomer extrusion is a relaxation phenomenon resulting from a physical reaction of the elastomer over a period of time to stress. In elastomer extrusion, the viscous flow property of elastomers gradually reduces contact stress at the seal faces, resulting in reduced pressure sealing capacity with respect to the sealed fluids. Stress relaxation is a relaxation phenomenon characterized by decaying stress over a period time in response to a breakdown of primary chemical bonds within the elastomer. Stress relaxation operates independently of extrusion to diminish seal strain at the inner and outer seal faces.

It is generally agreed that the relaxation phenomena occur at rates proportional to logarithmic time when the elastomer seal is used within conservative temperature limits. Thus, a compression-type elastomer seal may offer a reasonable life span in a relatively controlled environment, particularly where seal compression is adjusted periodically to maintain a reasonably constant axial stress. The environment of oilfield equipment, however, can never be wholly controlled and rigorous temperature conditions have been demonstrated to accelerate the relaxation processes. Excessive temperatures, for example, can cause relaxation processes to occur at rates that are proportional to linear time, rather than the much slower logarithmic time of a controlled environment.

Hence, it would be useful to devise a means for diminishing the detrimental effect of the above-described relaxation processes, whereby the sealing capacity of an annular elastomer seal is improved.

SUMMARY OF THE INVENTION

Accordingly, there is provided herein an annular elastomer seal having means for transforming a compression-type seal into a lip-type seal on gradual extrusion and stress relaxation of the elastomer material of which the seal is comprised. The seal includes a pair of grooves, forming in cross section a generally v-shaped cut, in at least one radial face of an annular compression-type seal. The grooves have a width which is small by comparison to the depth thereof and are angled apart so as to diverge with distance from the seal face.

Axially directed stress on the annular seal causes radially directed strain within the seal, closing the grooves and forcing the seal face radially outwardly against an opposing surface. As extrusion and stress relaxation act on the elastomer to diminish compressive sealing capability, pressurized fluid gradually seeps into the grooves, creating a lip seal against the opposing surface. Hence, the compression-type seal is transformed into a lip-type seal as the relaxation phenomena act on the elastomer material of the seal.

These and other characteristics and advantages of the present invention will become readily apparent to those skilled in the art upon reading the following detailed description.

BRIEF DESCRIPTION OF THE DRAWINGS

For a detailed description of the preferred embodiment of the invention, reference will now be made to the accompanying drawings, wherein:

FIG. 1 shows in cross-sectional and cut-away format a portion of a wellhead valve including an annular seal constructed in accordance with the principles of the present invention;

FIG. 2 depicts the apparatus of FIG. 1 with the seal thereof compressed axially into sealing engagement about its inner and outer diameters; and FIG. 3 depicts the effect of elastomeric relaxation processes on the seal shown in FIG. 2.

DESCRIPTION OF THE PREFERRED EMBODIMENT

Elastomer extrusion and stress relaxation are independent relaxation phenomena whereby the sealing capacity of a compression-activated, annular elastomer seal is gradually diminished. In accordance with the principles of the invention, there is provided herein an annular seal structure arranged for primary compression-type sealing about inner and outer diameter seal faces. As relaxation phenomena effectively reduce compressive stress, however, the compression-type seals gradually erode to form lip-type seals about the inner and outer diameter seal faces.

More particularly, there is shown in FIG. 1 a portion of a wellhead valve 10, including a valve stem 12, a valve bonnet 14, upper and lower seal compression rings 16,18, and an annular, elastomer seal 20. A portion of the valve stem 12 is cut away to reveal an inner seal face 22 of the seal 20. The seal 20, when activated by compression, blocks the path of axial fluid flow between the bonnet 14 and the valve stem 12.

As shown in FIG. 1, the annular seal 20 has a generally square-shaped radial cross section and includes v-shaped circumferential cuts 30,32 in the inner and outer radially facing surfaces 22,24, respectively, thereof. The cuts 30,32 each comprise a pair of grooves 34a,b having a width which is narrow by comparison to the radial depth thereof. As viewed in radial cross section, the grooves 34a,b are spaced to each side of the radial centerline of the seal 20 and diverge with depth away from the radial centerline so as to be symmetric with respect thereto. The grooves 34a,b define therebetween at both the inner and outer seal faces 22,24 circumferential compression seal points 38.

The annular seal 20 is depicted in FIG. 1 in its non-compressed state, that is, without axially directed compressive stress applied thereto. Referring now to FIG. 2, there is shown therein the annular seal 20 in its fully compressed state. The transition from the unstressed to the stressed state is accomplished by compressing the annular seal 20 between the upper and lower compression rings 16,18. For example, by application of torque to a threaded means not shown, the upper compression ring 16 may be forced downward, compressing the annular seal 20 against the lower compression ring 18, which may be held in place against the valve body (not shown).

Compressive stress applied axially to the annular seal 20 gradually closes the grooves 34a,b and forces the circumferential seal points 38 and the seal faces 22,24 radially outwardly into sealing engagement with the valve stem 12 and the valve bonnet 14, respectively. In this condition, increased stress generates improved sealing capability. Hence, the presence of the v-shaped cuts 30,32 does not inhibit the ability of the annular seal 20 to function as a compression-type seal. The cuts 30,32 do, however, provide an added dimension to the sealing capability of the seal 20.

Referring now to FIG. 3, the annular seal 20 of FIG. 2 is depicted in a relaxed state due to operation of certain relaxation phenomena on the elastomer comprising the seal. The effect of such relaxation as shown in FIG. 3 is exaggerated to demonstrate operation of the invention. Over a period of time after the seal 20 was first compressed to the state shown in FIG. 2, contact stress at the seal faces 22,24 gradually decayed due to elastomer extrusion and stress relaxation. Elastomer extrusion is a physical phenomenon resulting from the viscous flow of the stressed elastomer comprising the seal. Stress relaxation is a chemical reaction causing a breakdown of chemical bonds and a consequent reduction in stress.

As shown in FIG. 3, relaxation phenomena acting on the seal 20 cause a reduction in contact stress at the seal faces 22,24 and, consequently, a gradual loss of compressive sealing capacity. The loss of compressive sealing capacity, however, is offset by the simultaneous creation of lip sealing capability. The reduction in stress opens a space 40 within the grooves 34a,b and permits entry of pressurized fluid therein, forcing the seal 20 against the valve stem 12 and the valve bonnet 14. A pressurized fluid within the annular spaces 40 acts on exposed downstream sidewalls 42 of the seal 20, forcing the sidewalls 42 against the opposing valve surfaces and thereby creating the lip seals.

Assume, for example, that pressurized fluid tends to flow axially as shown by the arrow at 44. Loss or reduction of contact stress at the seal faces 22,24 allows seepage of pressurized fluid along the upstream ends 46 of the seal faces 22,24 to reach the annular spaces 40. Once in the annular spaces 40, the fluid acts on the sidewalls 42 of the grooves 34a to create the lip seals, preventing fluid seepage along the downstream ends 48 of the seal faces 22,24. Hence, the gradual reduction of compressive stress transforms the annular seal 20 into a lip seal, greatly extending the effective life of the seal.

It should be noted that the generally square cross-sectional configuration of the annular seal 20 depicted in FIG. 1 is not essential to the proper operation of the invention. A plurality of cross-sectional configurations may function in substantially the same manner when provided with the aforedescribed v-shaped cuts.

Similarly, in certain applications it may be desirable to include the v-shaped cuts about the inner seal face alone or the outer seal face alone. In neither of these variations do the principles of the invention vary from those described herein.

Finally, the principles of the present invention could be achieved by the use of a single groove of the aforedescribed pair of grooves in a sealing face. The single groove, however, when viewed in radial cross section, must form an acute angle with respect to that portion of the seal face which is downstream of the point where the groove intersects the seal face.

Thus, the annular seal 20 provides a suitable response to the relaxation phenomena associated with elastomer materials. As compressive stress is slowly reduced due to the action of relaxation phenomena, the compression-type seal provided by the annular seal 20 is transformed into a lip-type seal. While a preferred embodiment of the invention has been shown and described, modifications thereof can be made by one skilled in the art without departing from the spirit of the invention.

What is claimed is:

1. An annular, compression-actuated, elastomer seal member for forming a compression-type seal between concentric, generally cylindrical surfaces and for transforming the compression-type seal to a lip-type seal on relaxation of strain within said seal member, comprising:
   a first seal face for sealingly engaging a first of such generally cylindrical surfaces, said first seal face being sized in its relaxed state substantially to engage, but not form an effective fluid seal against, such first surface; and
   a first circumferential groove in said first seal face, said first groove, when viewed in radial cross section, forming an acute angle with respect to a portion of said first seal face which is axially downstream of the intersection of said first groove with said first seal face.

2. A seal member according to claim 1, wherein said first groove has a substantially constant width which is small by comparison to the depth thereof.

3. A seal member according to claim 2, further comprising a second circumferential groove in said first seal face, said second groove, when viewed in radial cross section, forming an acute angle with respect to a portion of said first seal face which is axially upstream of the intersection of said second groove with said first seal face.

4. A seal member according to claim 3, further comprising a seal point on said first seal face between said first and second grooves therein, said seal point sealingly engaging the first surface on compression of said seal member.

5. A seal member according to claim 1 wherein said first groove forms a single, continuous loop about the circumference of said first seal face.

6. A seal member according to claim 1, further comprising a second circumferential groove in said first seal face, said second groove, when viewed in radial cross section, forming an acute angle with respect to a portion of said first seal face which is axially upstream of the intersection of said second groove with said first seal face.

7. A seal member according to claim 6, further comprising a seal point on said first seal face between said first and second grooves therein, said seal point sealingly engaging the first surface on compression of said seal member.

8. An annular, elastomer, reciprocating seal member received within a stuffing box having first and second concentric, generally cylindrical surfaces, comprising:
   a first seal face, said first seal face, in its relaxed state, engaging such first surface without effective sealing contact; and
   a first pair of circumferential grooves in said first seal face, said first pair of grooves being generally parallel at said first seal face and diverging with increasing radial distance from said first seal face so as to resemble a "V" in radial cross section, whereby said first seal face sealingly engages the first surface on compression of said seal member and said seal member forms a lip-type seal at said first face on gradual loss of compressive sealing capacity.

9. A seal member according to claim 8 wherein said first pair of grooves defines therebetween a seal point on said first seal face for sealingly engaging the first surface on compression of said seal member.

10. A seal member according to claim 8, wherein the grooves of said first pair of grooves each have a substantially constant width which is small by comparison to the depth thereof.

11. A seal member according to claim 8, further comprising:
   a second seal face for sealingly engaging the second surface; and
   a second pair of circumferential grooves in said second seal face, said second pair of grooves being generally parallel at said second seal face and diverging with increasing radial distance from said second seal face so as to resemble a "V" in radial cross section.

12. A seal assembly, comprising:
   a stuffing box, including first and second generally concentric, cylindrical surfaces and first and second compression rings received between said first and second surfaces;
   an annular, elastomer seal member disposed within said stuffing box, said seal member having a first seal face for sealingly engaging said first surface, said first seal face being sized in its relaxed state substantially to engage, but not form an effective fluid seal against, said first surface; and
   a first circumferential groove in said first seal face, said first groove, when viewed in radial cross section, forming an acute angle with respect to a portion of said first seal face which is axially downstream of the intersection of said first groove with said first seal face.

13. A seal assembly according to claim 12, further comprising means for compressing said seal member between said first and second compression rings and for causing said first seal face of said seal member to form a compression-type seal against said first seal face.

14. A seal assembly according to claim 13, wherein said first groove has a substantially constant width which is small by comparison to the depth thereof.

15. A seal assembly according to claim 14, further comprising a second circumferential groove in said first seal face, said second groove, when viewed in radial cross section, forming an acute angle with respect to a portion of said first seal face which is axially upstream of the intersection of said second groove with said first seal face.

16. A seal assembly according to claim 15, further comprising a seal point on said first seal face between said first and second grooves therein, said seal point sealingly engaging said first surface on operation of said compressing means.

* * * * *